(12) United States Patent
Schwartz, II et al.

(10) Patent No.: US 7,158,296 B1
(45) Date of Patent: Jan. 2, 2007

(54) VISION SYSTEM WITH EYE DOMINANCE FORCED TO FUSION CHANNEL

(75) Inventors: Sheldon Schwartz, II, Auburn, NH (US); Matthew W. Reed, New Boston, NH (US)

(73) Assignee: Insight Technology, Inc., Londonderry, NH (US)

( * ) Notice: Subject to any disclaimer, the term of this patent is extended or adjusted under 35 U.S.C. 154(b) by 0 days.

(21) Appl. No.: 11/272,123

(22) Filed: Nov. 10, 2005

Related U.S. Application Data (60) Provisional application No. 60/627,197, filed on Nov. 12, 2004, provisional application No. 60/645,097, filed on Jan. 20, 2005, provisional application No. 60/585,327, filed on Jul. 2, 2004, provisional application No. 60/589,693, filed on Jul. 21, 2004.

(51) Int. Cl.
*G02B 23/00* (2006.01)
*G02B 27/14* (2006.01)
*G02B 13/14* (2006.01)

(52) U.S. Cl. ............... 359/407; 359/630; 359/356
(58) Field of Classification Search ........ 359/480–482, 359/407
See application file for complete search history.

(56) References Cited

U.S. PATENT DOCUMENTS

| | | | | |
|---|---|---|---|---|
| 2,256,587 A * | 9/1941 | Ames, Jr. et al. ........ 351/160 R |
| 4,445,766 A * | 5/1984 | Yamazaki ................... 396/432 |
| 4,468,101 A | 8/1984 | Ellis |
| 4,653,879 A | 3/1987 | Filipovich |
| 4,915,487 A | 4/1990 | Riddell |
| 5,079,416 A | 1/1992 | Filipovich |
| 5,229,598 A | 7/1993 | Filipovich |
| 5,254,852 A | 10/1993 | Filipovich |
| 5,282,082 A * | 1/1994 | Espie et al. ................. 359/353 |
| 5,416,315 A | 5/1995 | Filipovich |
| 5,483,336 A * | 1/1996 | Tocher ....................... 356/3.15 |
| 5,943,174 A | 8/1999 | Bryant |
| 6,061,182 A | 5/2000 | Carmeli |
| 6,081,094 A | 6/2000 | Crehshaw |
| 6,201,641 B1 | 3/2001 | Filipovich |
| 6,219,250 B1 | 4/2001 | Palmer |
| 6,288,386 B1 | 9/2001 | Bowen |
| 6,349,001 B1 * | 2/2002 | Spitzer ....................... 359/618 |
| 6,369,941 B1 * | 4/2002 | Zadravec .................... 359/419 |
| 6,379,009 B1 * | 4/2002 | Fergason ..................... 353/28 |
| 6,456,497 B1 | 9/2002 | Palmer |
| 6,462,867 B1 | 10/2002 | Choinere |
| 6,462,894 B1 | 10/2002 | Moody |
| 6,469,828 B1 | 10/2002 | Plotsker |
| 6,493,137 B1 | 12/2002 | Solinsky |
| 6,560,029 B1 | 5/2003 | Dobbie |
| 6,662,370 B1 | 12/2003 | Buchanan |
| 6,687,053 B1 | 2/2004 | Holmes |
| 6,788,459 B1 | 9/2004 | Holmes |
| 6,903,811 B1 * | 6/2005 | Watanabe ................... 356/5.01 |
| 6,977,776 B1 * | 12/2005 | Volkenandt et al. ........ 359/630 |

(Continued)

OTHER PUBLICATIONS

Insight Technology, Inc. U.S. Military AN/PVS-7D Night Vision Goggles. Copyright 2002.

(Continued)

*Primary Examiner*—Mark A. Robinson
*Assistant Examiner*—Scott Stephens (57) ABSTRACT

A fusion vision system has a first eyepiece through which a fused viewable image is larger than an image viewed through a second eyepiece to help the operator more easily view the fused image in their brain. The fusion vision system may employ image intensification and thermal imaging capabilities.

28 Claims, 6 Drawing Sheets

U.S. PATENT DOCUMENTS

2002/0030163 A1* 3/2002 Zhang .................... 250/330
2006/0048286 A1* 3/2006 Donato ..................... 2/422

OTHER PUBLICATIONS

Insight Technology, Inc. U.S. Military TS-4348/UV, Night Vision Device Test Set. Copyright 1998.
Insight Technology, Inc. Muti-use Mini-Monocular. Copyright 2002.
Insight Technology, Inc. Thermal Goggle System TGS-1000. Copyright 1998.
Insight Technology, Inc. Close-Quarter Battle Sight Short Range CQB-001C. Copyright 2004. Believed by applicant to be representative of prior art.
Photograph of Insight Technology, Inc. product CNVD. Beleived by applicant to be representative of prior art.
Photograph of Insight Technology, Inc. product OFG. Believed by applicant to be representative of prior art.
Photograph of Insight Technology, Inc. product PNVG. Believed by applicant to be representative of prior art.
Website www.atncorp.com/ProfessionalMilitaryNightVision printed May 16, 2005.
Insight Technology, Inc. Laser Aiming Module (LAM) An/PEQ-6. Copyright 1997.
Insight Technology, Inc. M3X Tactical Illuminator Copyright 2003.
Insight Technology, Inc. U.S. Military M30 Boresighting Equipment NSN:4933-01-394-7781. Copyright 1998.
Photograph of Insight Technology, Inc. product ENVG, Phase 2 Believed by Applicant to be representative of prior art.
Insight Technology, Inc. AN/TVS-5 Advanced Crew-served Weapon Sight (ACSWS). Copyright 2000.
Insight Technology, Inc. AN/PSQ-18A M203 Day Night Sight NSN 1010-01-516-0953. Copyright 2003.
Insight Technology, Inc. Medium Powered Laser Illuminator (MLPI) High Powered laser Illuminator (HPLI) AN/PEQ-4. Copyright 1998.
Insight Technology, Inc. U.S. Militatry AN/PEQ-5 Carbine Visible Laser (CVL). Copoyright 1997.
Insight Technology, Inc. U.S. Militatry AN/PEM-1 Laser Borelight System. Copyright 1999.
Insight Technology, Inc. U.S. Militatry AN/PEQ-2 &2A Infrared Target Pointer/Illuminator/Aiming Laser. NSN: 5855-01-422-5253 & NSN: 5855-01-447-8992. Copyright 1998.
Photograph of Insight Technology, Inc. product ENVG, Phase 1 Believed by Applicant to be representative of prior art.
ITT Industries, Binocular Night Vision Goggle, Ground Gen 3, AN/PVS-23 (F5050). 2 Pages. Copyright 2004. Believed by Applicant to be representative of prior art.
Northrop Grumman, Submersible Binocular Night Vision System (BVNS) AN/PVS-15.2 Pages. Believed by Applicant to be representative of prior art.
Northrop Grumman, Submersible Monocular Night Vision System, AN/PVS-18. 2 Pages. Believed by Applicant to be representative of prior art.
ITT Industries, Monocular Night Vision Device (MNVD) Generation 3, F6015 Series. 2 Pages, Dated Sep. 2003. Believed by Applicant to be representative of prior art.
Northrop Grumman, Monocular Night Vision Device AN/PVS-14 2 Pages. Believed by Applicant to be representative of prior art.
NIGHTVISIONWEB.COM, Compact Night Vision Goggles ANVS-3103 2 Pages. Copyright 2000-2004 Printed Jul. 14, 2005.
NIGHTVISIONWEB.COM, PRO Series Night Vision Goggles ANVS-3105 2 Pages. Copyright 2000-2004 Printed Jul. 14, 2005.
NIGHTVISIONWEB.COM, Deluxe Night Vision Goggles ANVS-3107 2 Pages. Copyright 2000-2004 Printed Jul. 14, 2005.
NIGHTVISIONWEB.COM, Night Vision Goggles Night Cougar 1 Page. Copyright 2000-2005 Printed Jul. 14, 2005.
NIGHTVISIONWEB.COM, Night Vision Goggles Viper 2 Pages. Copyright 2000-2005 Printed Jul. 14, 2005.
NIGHTVISIONWEB.COM, Night Vision Goggles Argus w/IR Illuminator 2 Pages. Copyright 2000-2004 Printed Jul. 14, 2005.
NIGHTVISIONWEB.COM, Night Vision Mono Goggles Argus-M w/IR Illuminator, 2 Pages. Copyright 2000-2005 Printed Jul. 14, 2005.
NIGHTVISIONWEB.COM, PVS-7 Night Vision Goggles 2 Pages. Copyright 2000-2005 Printed Jul. 14, 2005.
NIGHTVISIONWEB.COM, Night Quest 5001 2 Pages. Copyright 2000-2005 Printed Jul. 14, 2005.
NIGHTVISIONWEB.COM, NVG7-2/3 Night Vision Goggle 2 Pages. Copyright 2000-2005 Printed Jul. 14, 2005.
NIGHTVISIONWEB.COM, Gen 2+ /3 Night Vision Goggles D-221G/321G 2 Pages. Copyright 2000-2005 Printed Jul. 14, 2005.
NIGHTVISIONWEB.COM, NVG7-2/3 Night Vision Goggle 2 Pages. Copyright 2000-2005 Printed Jul. 14, 2005.
NIGHTVISIONWEB.COM, Aurora,high grade compact Night Vision Scope w/IR. 1 Page. Copyright 2000-2005 Printed Jul. 14, 2005.
NIGHTVISIONWEB.COM, Budget Night Vision Scope NZT-1 1 Page. Copyright 2000-2005 Printed Jul. 14, 2005.
NIGHTVISIONWEB.COM, Helios 101, high grade Hight Vision Scope w/IR 1 Page. Copyright 2000-2005 Printed Jul. 14, 2005.
NIGHTVISIONWEB.COM, Multitask Night Vision Scope, Model NVMT 2x24. 2 Pages. Copyright 2000-2005 Printed Jul. 14, 2005.
NIGHTVISIONWEB.COM, PRO Night Vision monocular Dipol-111 w/IR Illuminator 2 Pages. Copyright 2000-2005 Printed Jul. 14, 2005.
NIGHTVISIONWEB.COM, Multitask Night Vision Scope, Model NVMT 3x42. 2 Pages. Copyright 2000-2005 Printed Jul. 14, 2005.
NIGHTVISIONWEB.COM, Helios 112, waterproof Night Vision Scope w/IR 1 Page. Copyright 2000-2005 Printed Jul. 14, 2005.
NIGHTVISIONWEB.COM, Long Range Night Vision monocular Argus-M4 w/IR Illum. 2 Pages. Copyright 2000-2005 Printed Jul. 14, 2005.
NIGHTVISIONWEB.COM, Night Storm, Waterproof Night Vision Scope 2 Pages. Copyright 2000-2005 Printed Jul. 14, 2005.
NIGHTVISIONWEB.COM, High Grade Vision Scope MO2-1 2 Pages. Copyright 2000-2005 Printed Jul. 14, 2005.
NIGHTVISIONWEB.COM, Multitask Gen 2+ Night Vision Scope Model NVMT 2x24 G2 2 Pages. Copyright 2000-2005 Printed Jul. 14, 2005.
NIGHTVISIONWEB.COM, Night Vision Monocular PS-14 2 Pages. Copyright 2000-2005 Printed Jul. 14, 2005.
NIGHTVISIONWEB.COM, Night Quest 6010,Night Quest 6015, Night Quest PVS-14 2 Pages. Copyright 2000-2005 Printed Jul. 14, 2005.
NIGHTVISIONWEB.COM, Tactical Night Vision Scope ANVS-1344/Mini Monocular 2 Pages. Copyright 2000-2005 Printed Jul. 14, 2005.
NIGHTVISIONWEB.COM, Night Storm, Waterproof Night Vision Scope 2 Pages. Copyright 2000-2005 Printed Jul. 14, 2005.
NIGHTVISIONWEB.COM, MO-4X series Night Vision Scopes 2 Pages. Copyright 2000-2005 Printed Jul. 14, 2005.
NIGHTVISIONWEB.COM, Night Vision Monocular ANVS-1330 2 Pages. Copyright 2000-2005 Printed Jul. 14, 2005.
Martin S. Banks, Tandra Ghose, James M. Hillis, Relative Image Size, Not Eye Position, Determines Eye Dominance Switches. Science Direct, Vision Research, vol. 44, Issue 3, Feb. 2004, 6 Pages.

* cited by examiner

VISION SYSTEM WITH EYE DOMINANCE FORCED TO FUSION CHANNEL

CROSS REFERENCE TO RELATED APPLICATIONS

The present application claims the benefit of U.S. provisional patent application Ser. No. 60/627,197, filed Nov. 12, 2004; Ser. No. 60/585,327, filed Jul. 2, 2004; Ser. No. 60/589,693 filed Jul. 21, 2004, and Ser. No. 60/645,097, filed Jan. 20, 2005, the entire disclosures of which are incorporated herein by reference.

TECHNICAL FIELD

The present invention is generally related to vision systems having a fused channel and, more particularly, to vision systems presenting the image viewed through the fused channel larger than the image viewed through the non-fused channel.

BACKGROUND OF THE INVENTION

Night vision systems include image intensification, thermal imaging, and fusion monoculars, binoculars, bioculars, and goggles, whether hand-held, weapon mounted, or helmet mounted. Standard night vision systems are typically equipped with one or more image intensifier tubes to allow an operator to see visible wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the scene. These devices have been used by soldier and law enforcement personnel to see in low light conditions, for example at night or in caves and darkened buildings. These devices take ambient light and magnify the light up to and in excess of 50,000 times and display the image for viewing through an eyepiece. A drawback to night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared. One advantage of infrared sensors is that they are less attenuated by smoke and dust and a drawback is that they typically do not have sufficient resolution and sensitivity to provide acceptable imagery of the scene.

Fusion night vision systems have been developed that combine image intensification with thermal sensing. The image intensification information and the infrared information are fused together to provide a combined image that provides benefits over just image intensification or just thermal sensing. The image may be fused optically or electronically.

With binocular fusion night vision systems, either the fused image appears in both the left and the right eyepiece, or one eyepiece has the fused image and the other eyepiece has either just image intensification information or just thermal information. Having different information in the two eyepieces can make it more difficult for the operator to comprehend the scene.

Fusion night vision systems are typically used by the military and law enforcement personnel and are either hand carried or mounted to a helmet. These devices include image intensification tubes, focal plane arrays, and displays that take up space, add to the system weight and cost, and consume power. A reduction in the quantity of components is desirable.

BRIEF DESCRIPTION OF THE DRAWINGS

Features and advantages of the present invention are set forth by description of embodiments consistent therewith, which description should be considered along with the accompanying drawings, wherein.

DETAILED DESCRIPTION

Figure 1:
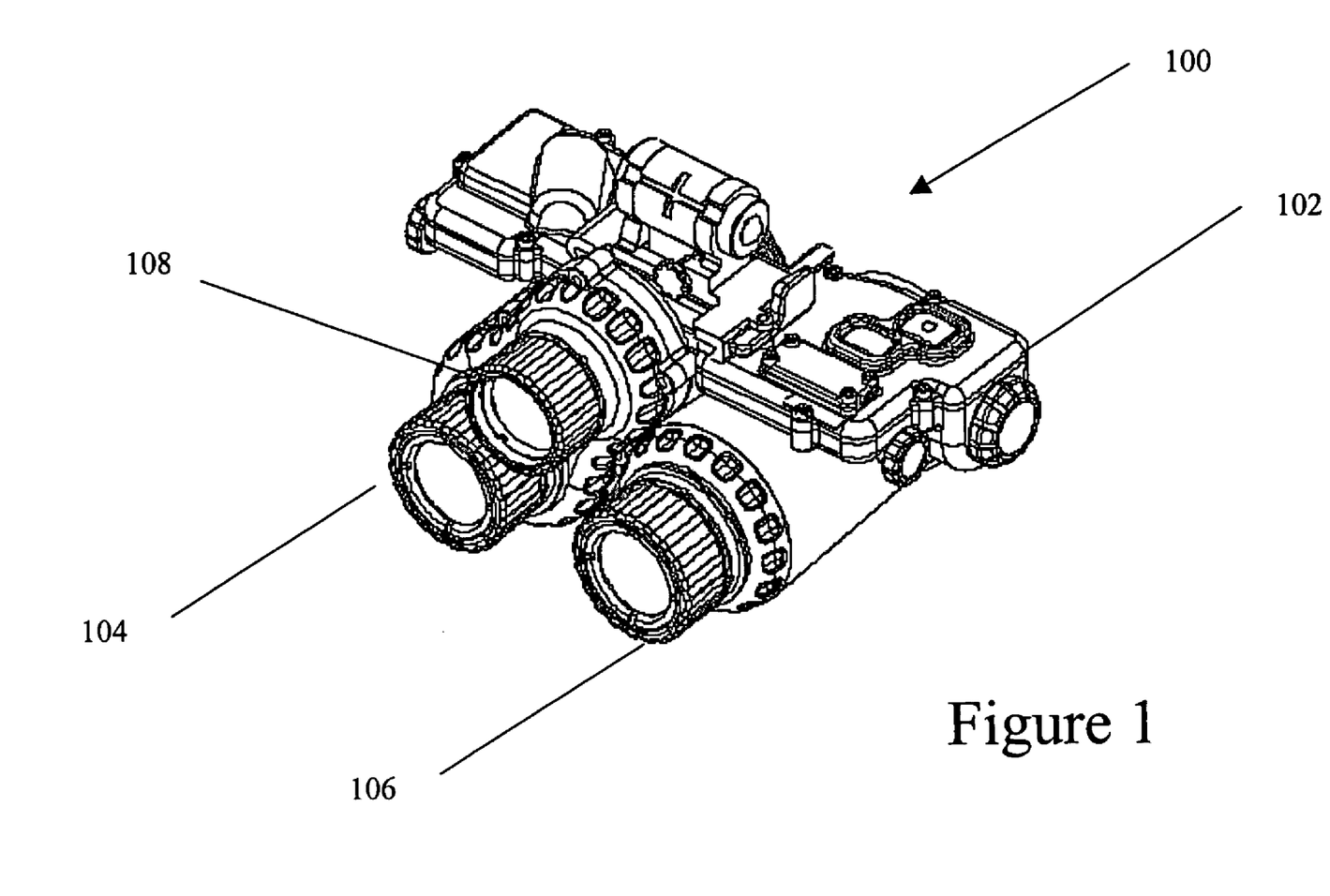
FIG. 1 is an isometric view of a fusion vision system consistent with one embodiment of the present invention.
Figure 2:
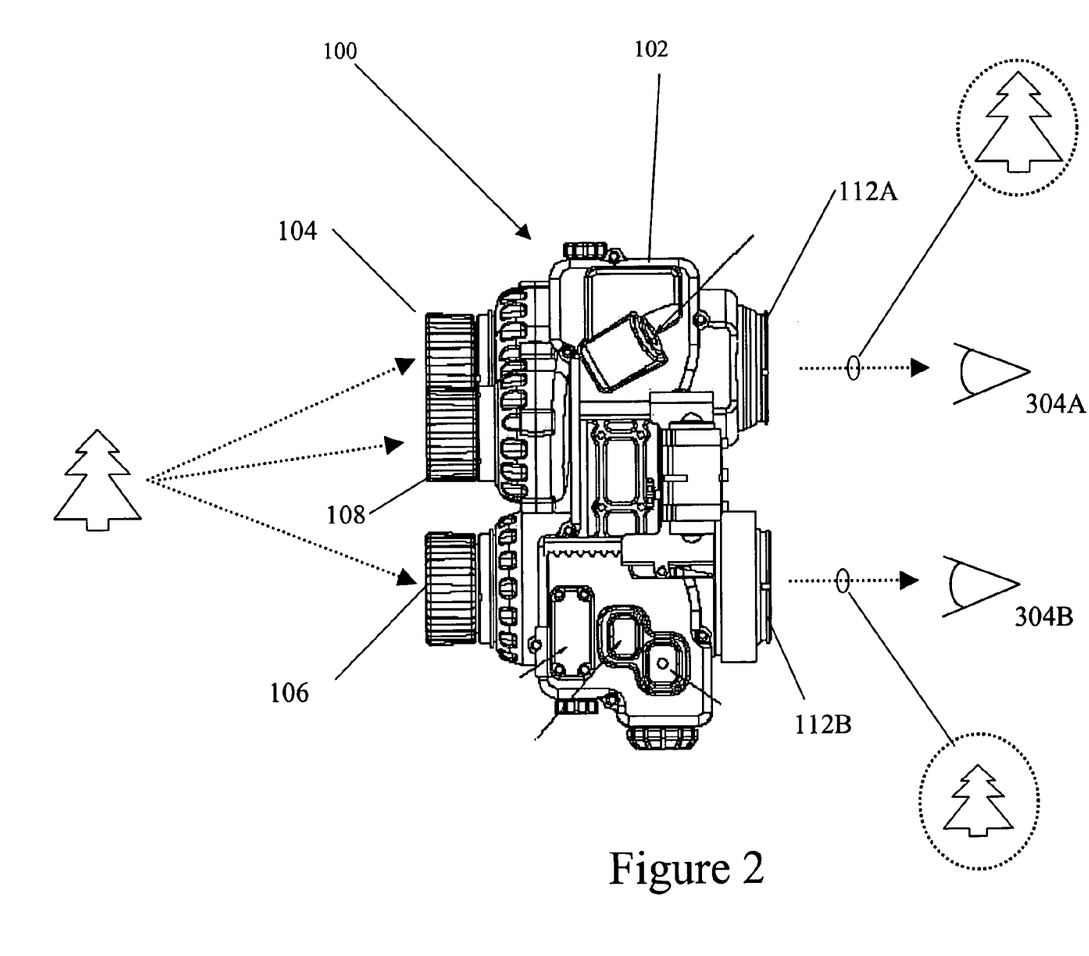
FIG. 2 is a top view of the fusion vision system of FIG. 1.

FIGS. 1 and 2 are views of a fusion vision system 100 consistent with one embodiment of the present invention. The fusion vision system 100 may have a housing 102, a first image intensification channel 104, a second image intensification channel 106, and a thermal channel 108. The first and second image intensification channels 104, 106 may be configured to process information in a first range of wavelengths (for example the visible portion of the electromagnetic spectrum from approximately 400 nm to 900 nm) and the thermal channel 108 may be configured to process information in a second range of wavelengths (for example approximately 7,000 nm–14,000 nm). The low end and the high end of the ranges of wavelengths may vary without departing from the invention. The system 100 may be mounted to a military helmet and powered by a removable battery pack 110 (see FIG. 3). An operator can view a scene through a right eyepiece 112A and a left eyepiece 112B. Information from the first image intensification ($I^2$) channel 104 may be fused with the information from the thermal channel 108 and presented for viewing through the right eyepiece 112A and information from the second $I^2$ channel 106 may be presented for viewing through the left eyepiece 112B. The eyepieces 112A, 112B may have one or more ocular lenses.

Figure 3:
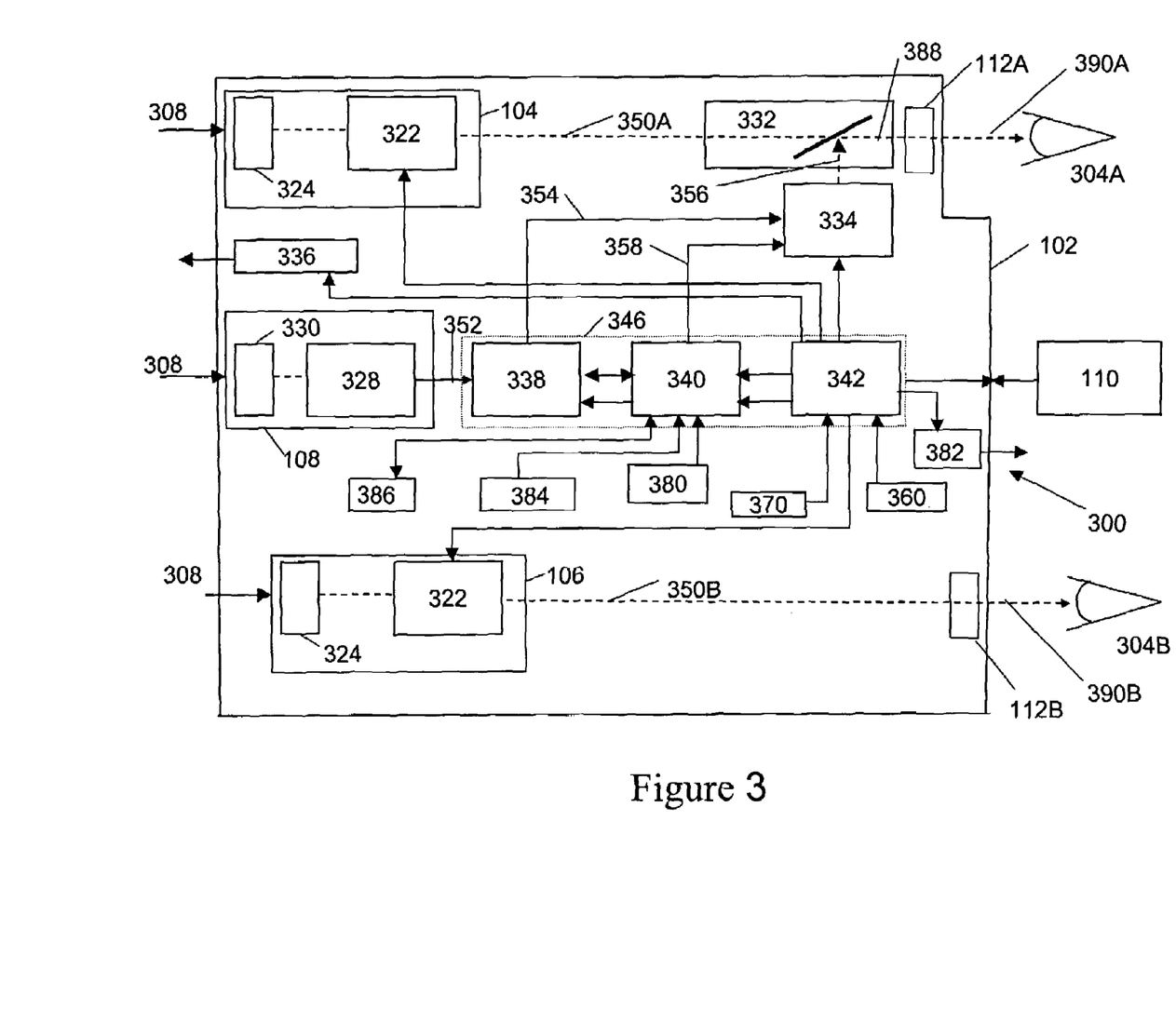
FIG. 3 is a block diagram of a fusion vision system consistent with another embodiment of the present invention.
Figure 3A:
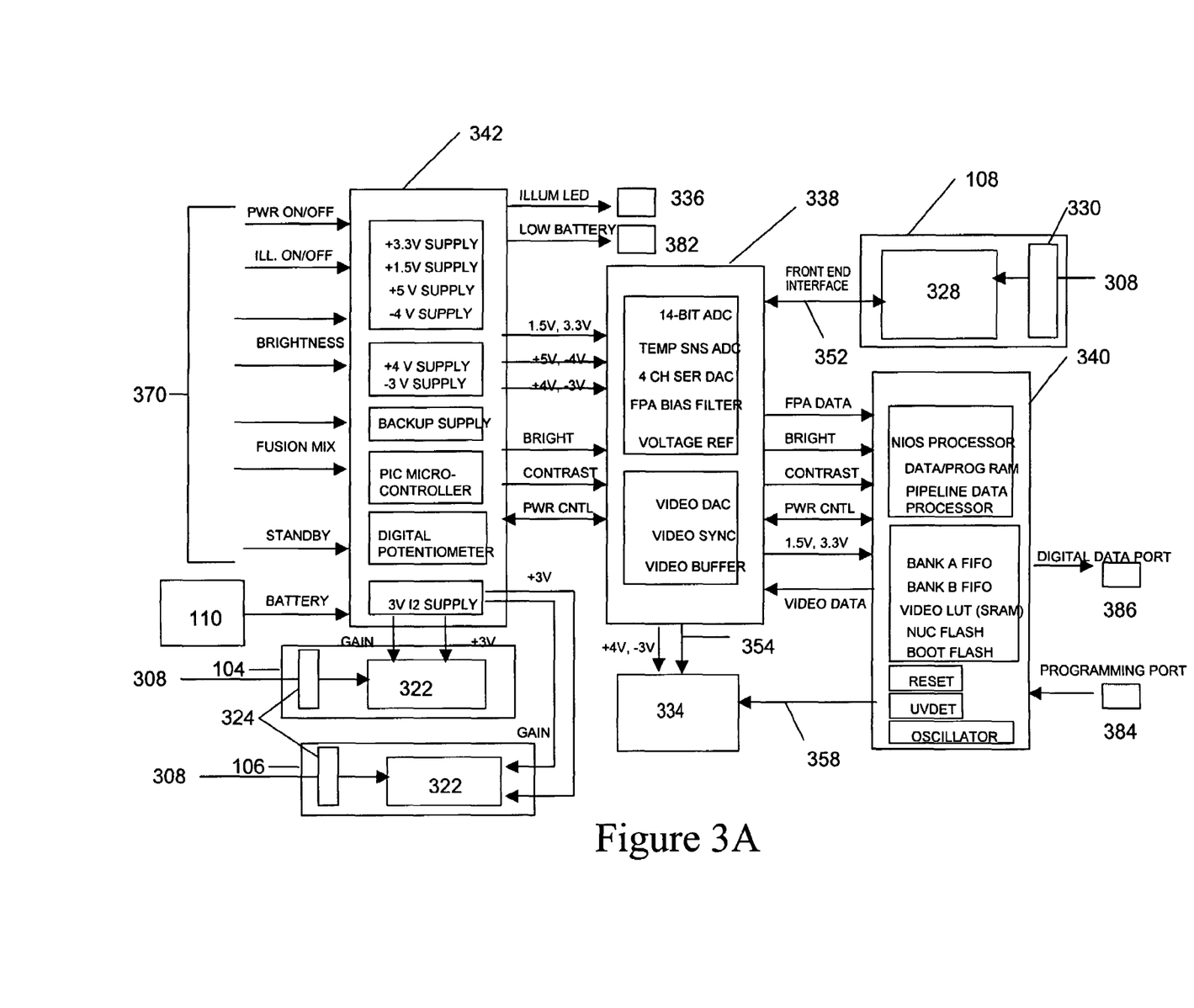
FIG. 3A is a block diagram detailing interconnections between blocks shown in FIG. 3.

FIG. 3 is a block diagram of a fusion vision system 300 consistent with another embodiment of the present invention. The electronics and optics may be housed in the housing 102. Information from the first $I^2$ channel 104 and the thermal channel 108 may be fused together and presented for viewing to an operator's right eye 304A. Although reference will be made several times to the right eye, the fused image alternatively may be presented for viewing in the operator's left eye without departing from the present invention. The first I² channel 104 and the second I² channel 106 may each have an objective focus 324 and an I² tube 322 for viewing a scene 308. Suitable I² tubes 322 may be Generation III tubes and are available from Northrop Grumman and ITT. Image 350A from the first I² channel 104 may be directed into a combiner optic 332, for example a partially reflective beam splitter.

The thermal channel 108 may have an objective focus 330 and an infrared focal plane array 328. The focal plane array may be a U7000J from DRS. An analog signal 352 from the focal plane array 328 may be inputted into a circuit assembly 346 possibly having an analog circuit card assembly 338, a digital circuit card assembly 340, and a power and control circuit card assembly 342. An analog video out signal 354 from the analog circuit card assembly 338 may be inputted into a display 334. A serial bus 358 coupled to the digital circuit card assembly 340 may control the size, resolution, and offset of the display 334. The display 334 may be a miniature flat panel display, for example a yellow monochrome organic light emitting diode (OLED) microdisplay available from eMagin Corp.

Additionally, the display 334 may be used to present additional information needed by the operator. The additional information may include text, numbers, symbology, illustrations, and icons. The information may include commands from headquarters, operator global coordinates, distance to target, vehicle control/operating information, etc.

I² image 350A from the first channel 104 and image 356 from the display 334 may be directed into the combiner optics 332 to generate a fused image 388 which may then be directed into the right eyepiece 112A for presentation to the viewer's right eye 304A as a first viewable image 390A. I² image 350B from the second I² channel 106 may be directed into the left eyepiece 112B for presentation to the viewer's left eye 304B as a second viewable image 390B.

The fusion vision system 300 may have an illumination LED 336 and a plurality of user actuatable actuators 370, a programming port 384, a digital data port 386 for transferring data, and a low battery signal generator 382. The plurality of actuators 370 may allow the operator to turn the system 300 on and off, scroll through menus viewable through the right eyepiece 112A, and make a selection. The actuators 370 may employ a silicone overlay over tactile dome switches. The overlay may be coupled to the housing 102 to seal out moisture and particulates and the dome switches may be coupled to the circuit assembly 346.

Eye Dominance typically refers to the eye that the brain "prefers" or one that has stronger "processing" in the brain than the other. People usually have one eye that likes to "take over" when binocular vision is impaired, or one eye that is more sensitive to visual discrimination.

If a fused image is presented to an operator in their non-dominant eye, it may be more difficult for the operator to comprehend the scene. Eye dominance may be "forced" to a non-dominant eye by increasing the image size in the non-dominant eye over the image size in the dominant eye. A fusion vision system consistent with one embodiment the present invention may be used by operators with left or right eye dominance without departing from the invention.

Right eyepiece 112A and left eyepiece 112B may be configured, for example by magnification or demagnification, to make fused viewable image 390A appear larger than viewable image 390B, for example by 0.5%–10%, more particularly 2–4%, and more particularly 3%. This may help the operator to more easily combine the image intensification information with the thermal information in their brain.

In an alternative embodiment, scaling of the viewable images may be done at the objective lenses 324, 330 and/or at the display 334, or a combination thereof.

The fusion vision system 300 may be called upon by the operator to view the scene 308 in a variety of adverse conditions, for example in very low light conditions, through smoke or heavy fog, and sand storms. In each of these conditions the operator may wish to rely more heavily on the first and second channels 104, 106 (I²) than the third channel 108 (thermal) and in other conditions the user may wish to rely more heavily on the third channel 108 than the first and second channels 104, 106. The fusion vision system 300 may have one or more actuators to control the mix of information from the first and second channels 104, 106 and the third channel 108 viewable through the eyepiece 112A, 112B. At one extreme the viewable image 390A contains generally 100% image intensification information, at the other extreme the viewable image 390A contains generally 100% thermal information, and in between the two extremes, the circuit assembly 346 provides a mix of I² and thermal information. A mix actuator/s 360 may be coupled to a microcontroller on the circuit assembly 346 that controls the gain of the I² tubes 322 and the contrast and brightness of the thermal image presented in the display 334. The microcontroller may control a digital potentiometer coupled to the gain control input of the I² tube. The fusion vision system 300 may be configured to maintain a perceived brightness of the fused image 388 over a range of I² and thermal mixes.

The fusion vision system may also include a parallax compensation circuit to compensate for the channels 104, 106, 108 being offset from each other. The longitudinal axis of the first channel 104 and the third channel 108 may be factory aligned such that the thermal image 356 of a scene from the thermal channel 108 and I² image 350A from the I² channel 104 are aligned on the image combiner 332 when the target is at the predetermine distance, for example infinity. Note that the channels can be offset in the horizontal direction, the vertical direction, or as shown in a combination. When the channels are offset in the vertical direction, the processor may compensates by offsetting images up or down in the display 334 and when the channels are offset in the horizontal direction, the processor may compensates by offsetting images left or right in the display 334 to ensure thermal image 356 and the I² image 350A are aligned when viewed through the eyepiece 112A. A range finder may be utilized to determine the distance to target.

In an alternative embodiment, the fusion vision system 300 may accept inputs from a user regarding the distance to target. The input may be received through a near/far actuator or a menu selection. The fusion vision system 300 may be designed so the operator selects the far mode when the object being viewed is greater than 10 meters away and the operator selects the near mode when the object being viewed is less than 10 meters away. Distances other than 10 meters may be chosen without departing from the invention. The fusion vision system 300 may also incorporate multiple distance choices, for example close, less than 5 meters; mid range, 5–20 meters; and long range, greater than 20 meters, without departing from the invention.

It has been discovered that target locating and identification can be improved with edge detection of the thermal image. An edge detection circuit may be used without departing from the present invention Fusion vision systems may be used at night with a weapon having an infrared laser illuminator aligned with the bore of the weapon. The fusion vision system 300 allows the operator to aim and fire the weapon without having to look through a scope. The operator may locate the target using the thermal channel information and align the weapon with the $I^2$ channel information. When attempting to acquire a target using a fusion vision system having automatic gain control of the thermal and the $I^2$ channels, the $I^2$ information from the laser illuminator may swamp the eyepiece making locating the target more difficult. To overcome this problem, the operator may switch the fusion vision system into a "targeting mode" when trying to acquire a target. After the system receives an enter targeting mode signal the system may turn down the gain from the $I^2$ tubes using a digitally controlled potentiometer and reduce CCD electronic gain by reducing electronic shutter period, and leave the automatic gain of the thermal channel enabled. Targeting mode may be accessed through a dedicated actuator or through a menu.

Figure 4:
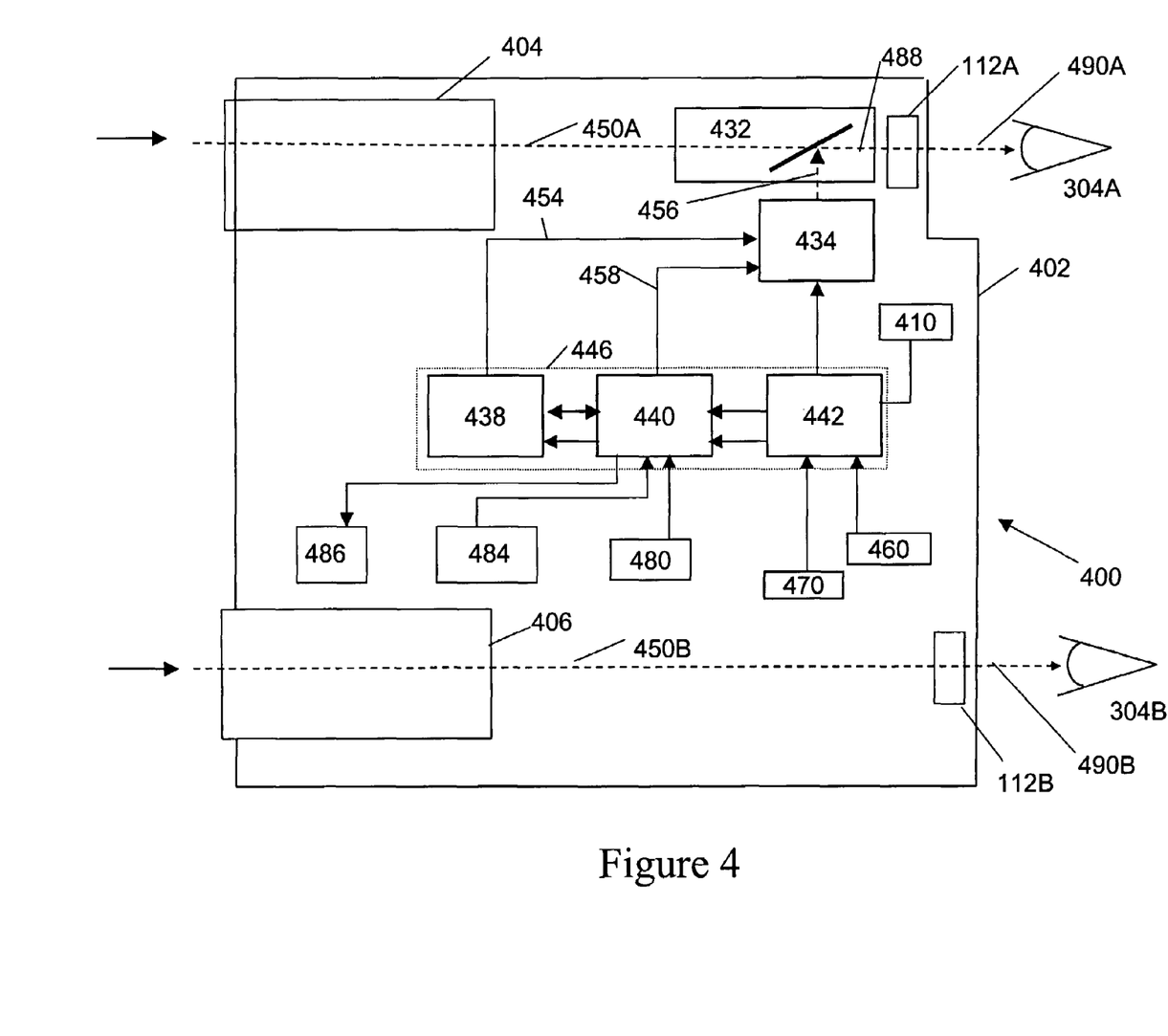
FIG. 4 is a block diagram of a fusion vision system consistent with another embodiment of the present invention.

FIG. 4 is a block diagram of a fused vision system 400 consistent with another embodiment of the present invention. The vision system 400 may have a housing 402, a first optical channel 404, a second optical channel 406, a display 434, and an image combiner 432. The first and second optical channels 404, 406 may be configured to image a scene in the visible spectrum (from approximately 400 nm to 900 nm) without an $I^2$ tube. First and second optical channels 404, 406 may include a series of lenses for magnifying a scene. The system 400 may be hand-held or mounted to a military helmet and have an internal battery 410 or a removable battery pack. An operator can view a scene through a right eyepiece 112A and a left eyepiece 112B. The display 434 may display graphical information received from a circuit assembly 446. The graphical information may include, but is not limited to, commands received from a remote location, operator global coordinates, distance to target, vehicle control/operating information, etc.

The circuit assembly 446 may have an analog circuit card assembly 438, a digital circuit card assembly 440, and a power and control circuit card assembly 442. An analog video out signal 454 from the analog circuit card assembly 438 may be inputted into the display 434. A serial bus 458 coupled to the digital circuit card assembly 440 may control the size, resolution, and offset of the display 434. The display 434 may be a miniature flat panel display, for example a yellow monochrome organic light emitting diode (OLED) microdisplay available from eMagin Corp. The circuit assembly 446 may receive information from an on board range finder 460 or a global positioning system or compass 480. The circuit assembly 446 may also receive information through a receiver 484 from a remote location, for example from another soldier, an aircraft, or headquarters. The circuit assembly may also transmit information through a transmitter 486 to a remote location. The fused vision system 400 may also have a plurality of user actuatable actuators 470 that may allow the operator to turn the system on and off, scroll through menus viewable through the right eyepiece 112A, and make a selection.

Image 450A from the first optical channel 404 may be fused with graphical information 456 and presented as a fused image 488 which may then be directed into the right eyepiece 112A for presentation to the viewer's right eye 304A as a first viewable image 490A. Information 450B from the second optical channel 406 may be directed into the left eyepiece 112B for presentation to the viewer's left eye 304B as a second viewable image 490B. The image 450A from the first optical channel 404 and the graphical information 456 may be fused in the image combiner 434, for example a partially reflective beam splitter. Although reference will be made several times to the right eye, the fused viewable image alternatively may be presented for viewing in the operator's left eye without departing from the present invention. The eyepieces 112A, 112B may have one or more ocular lenses.

Right eyepiece 112A and left eyepiece 1121B may be configured, for example by magnification or demagnification, to make the first (fused) viewable image 490A appear larger than the second (non-fused) viewable image 490B, for example by 0.5%–10%, more particularly 2–4%, and more particularly 3%. This may help the operator to more easily combine the image intensification information with the thermal information in their brain.

In an alternative embodiment, scaling of the viewable images may be done in the first and second optical channels 404, 406 and/or at the display 434, or a combination thereof.

Figure 5:
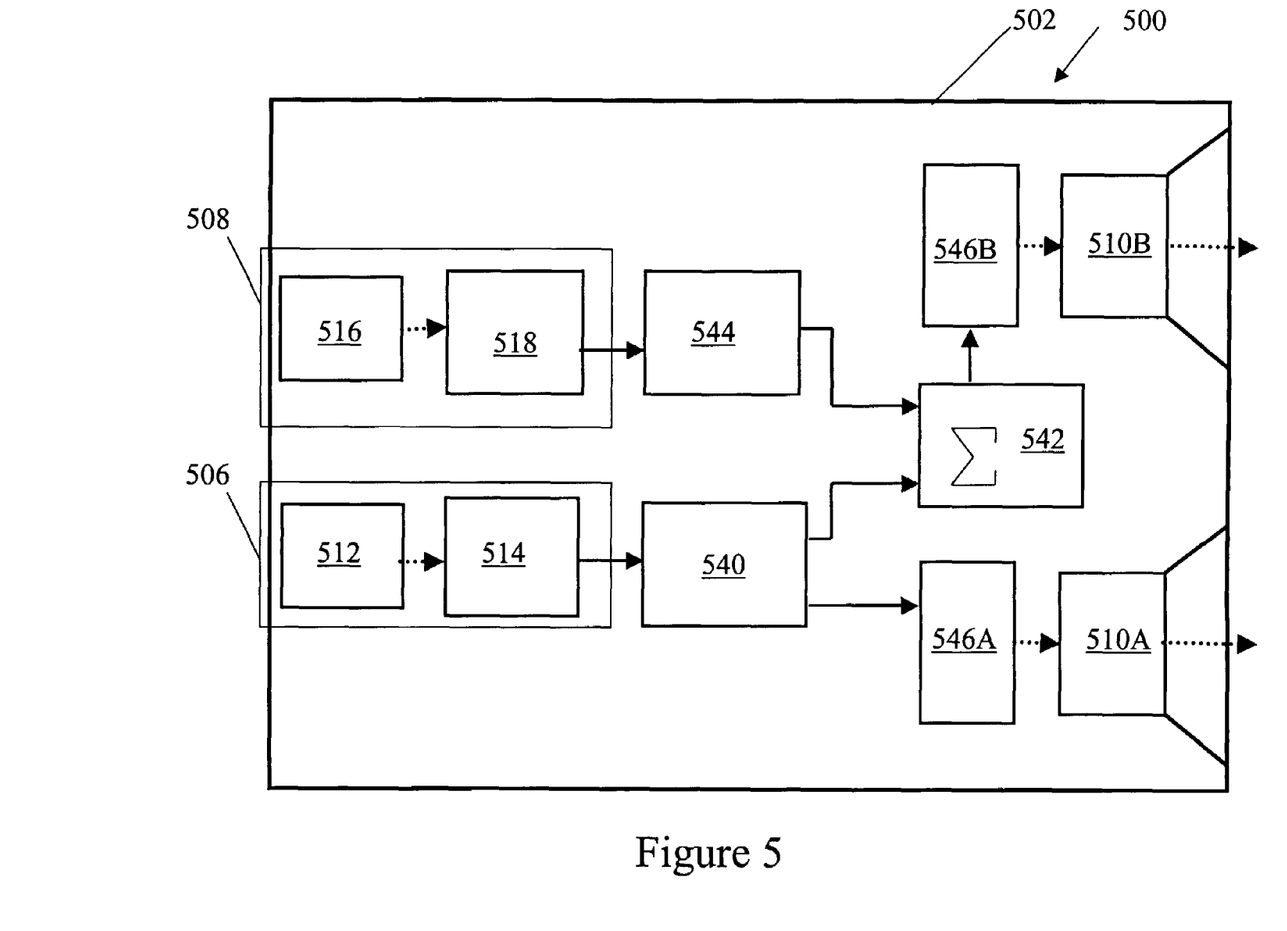
FIG. 5 is a block diagram of a fusion vision system consistent with another embodiment of the present invention.

FIG. 5 is a block diagram of a fused vision system 500. The electronics and optics may be housed in a housing 502, which can be mounted to a military helmet, and are powered by batteries. Information from an image intensification ($I^2$) channel 506 and a thermal channel 508 are fused together for viewing by an operator through one or more eyepieces 510. The eyepieces 510 have one or more ocular lenses for magnifying and/or focusing the fused image. The $I^2$ channel 506 is configured to process information in a first range of wavelengths (the visible portion of the electromagnetic spectrum from 400 nm to 900 nm) and the thermal channel 508 is configured to process information in a second range of wavelengths (7,000 nm–14,000 nm). The $I^2$ channel 506 has an objective focus 512 and an $I^2$ tube 514 and the thermal channel 508 has an objective focus 516 and an infrared sensor 518, for example a focal plane array.

The $I^2$ information may be coupled to a charge-coupled device (CCD) and electronics 540 and the thermal information may be coupled to signal processing electronics 544. The output from the CCD and electronics 540 may be inputted into both the mixing/display electronics 542 and a first display 546A for viewing through eyepieces 510A. The output from the signal processing electronics 544 may be inputted into mixing/display electronics 542. The fused analog video signal output of the mixing/display electronics 542 may then be coupled to a second display 546B for viewing through eyepieces 510BA. The mixing/display electronics 542 may be configured to modify the size of the fused image so that the fused image appears larger in the second eyepiece 510B than the non-fused image appears in the first eyepiece 510A. Alternatively, an ocular lens assembly in one of the first and second eyepieces 510A, 510B may modify the size of the fused image so that the fused image appears larger in the second eyepiece 510B than the non-fused image appears in the first eyepiece 510A.

According to one aspect there is provided a fusion vision system that may include a housing, a first and a second channel for processing information in a first range of wavelengths, a third channel for processing information in a second range of wavelengths, an image combiner for combining the information from the first channel and the third channel to generate a fused image. A first eyepiece being aligned with the fused image and a second eyepiece being aligned with the second channel such that the fused image viewed through the first eyepiece is larger than an image viewed through the second eyepiece.

In another aspect there is provided a method of displaying information representative of a scene, the method may include the steps of: acquiring information representative of the scene from a first and a second channel configured to process information in a first range of wavelengths; acquiring information representative of the scene from a third channel configured to process information in a second range of wavelengths; combining the acquired information from the first and third channels into a fused image; displaying the fused image in a first eyepiece at a first size, and displaying the acquired information from the second channel in a second eyepiece such that the image viewable through the second eyepiece is smaller than the fused image viewable through the first eyepiece.

In another aspect there is provided a binocular vision system that may include a housing, first and second channels coupled to the housing and configured to image a scene in a first range of wavelengths, a display for displaying information, a combiner for combining an image from the first channel with information from the display to generate a fused image, and a first and a second eyepiece. The first eyepiece aligned with the fused image and the second eyepiece aligned with the image from the second channel such that the fused image viewed through the first eyepiece is larger than an image viewed through the second eyepiece.

In yet another aspect there is provided a binocular vision system that may include a housing, a first channel configured to image a scene in a first range of wavelengths, a second channel configured to image a scene in a second range of wavelengths, a combiner configured to generate a fused image from an image from the first channel with an image from the second channel, a first display aligned with a first eyepiece for projecting the fused image, and a second display aligned with a second eyepiece for projecting the image from the first channel. The system configured such that the fused image when viewed through the first eyepiece is larger than the image from the first channel when viewed through the second eyepiece.

Although several embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A fusion vision system, comprising:
   a housing;
   a first channel coupled to the housing for processing information in a first range of wavelengths;
   a second channel coupled to the housing for processing information in the first range of wavelengths;
   a third channel coupled to the housing for processing information in a second range of wavelengths;
   an image combiner for combining information from the first channel with information from the third channel to generate a fused image;
   a first eyepiece aligned with the fused image; and
   a second eyepiece aligned with the second channel, wherein the fused image viewed through the first eyepiece is larger than an image viewed through the second eyepiece.

2. The fusion vision system of claim 1, wherein the first range of wavelengths is approximately 400 nm to approximately 900 nm and the second range of wavelengths is approximately 7,000 nm to approximately 14,000 nm.

3. The fusion vision system of claim 1, further comprising a display for projecting an image to an operator.

4. The fusion vision system of claim 1, wherein the image combiner is a beam splitter.

5. The fusion vision system of claim 1, further comprising a parallax compensation circuit coupled to a display and configured to receive distance to target information.

6. The fusion vision system of claim 5, further comprising a focusable lens aligned with the first channel for determining a distance to target.

7. The fusion vision system of claim 6, wherein movement of the focusable lens communicates a signal to the parallax compensation circuit indicative of the distance to target.

8. The fusion vision system of claim 5, wherein the parallax compensation circuit shifts information from a selected one of the first channel and the third channel on the display based on distance to target information.

9. The fusion vision system of claim 1, wherein the first channel has an objective focus and an image intensification tube and the third channel has an objective focus and a focal plane array.

10. The fusion vision system of claim 1, wherein the first eyepiece is configured to magnify the fused image 1–10% larger than the image viewed through the second eyepiece.

11. The fusion vision system of claim 10, wherein the first eyepiece is configured to magnify the fused image 2–4% larger than the image viewed through the second eyepiece.

12. The fusion vision system of claim 1, further comprising an ocular lens assembly in the first eyepiece configured to modify the fused image so it appears larger than the image viewed through the second eyepiece.

13. The fusion vision system of claim 1, wherein the first eyepiece and the second eyepiece are coupled to the housing.

14. A method of displaying information representative of a scene, comprising the steps of:
   acquiring information representative of the scene from a first and a second channel, the first and second channels configured to process information in a first range of wavelengths;
   acquiring information representative of the scene from a third channel, the third channel configured to process information in a second range of wavelengths;
   combining the acquired information from the first channel with the acquired information from the third channel;
   displaying the combined information in a first eyepiece at a first size; and
   displaying the information from the second channel in a second eyepiece at a second and smaller size such that eye dominance is forced to an eye viewing the combined information in the first eyepiece.

15. The method of displaying information of claim 14, wherein the first range of wavelengths is approximately 400 nm to approximately 900 nm and the second range of wavelengths is approximately 7,000 nm–14,000 nm.

16. The method of claim 14, wherein the step of displaying the combined image comprises magnifying the combined image 1–10% larger than the image viewed through the second eyepiece.

17. The method of claim 16, wherein the step of displaying the combined image comprises magnifying the combined image 2–4% larger than the image viewed through the second eyepiece.

18. The method of claim 14, wherein the information representative of the scene acquired from the first channel is processed in a first image intensifier tube aligned with the first eyepiece which is coupled to the housing and the information representative of the scene acquired from the second channel is processed in a second image intensifier tube aligned with the second eyepiece which is coupled to the housing.

19. A binocular vision system, comprising:
a housing;
a first channel coupled to the housing and configured to image a scene in a first range of wavelengths;
a second channel coupled to the housing and configured to image a scene in the first range of wavelengths;
a display for displaying information;
a combiner for combining an image from the first channel with information from the display to generate a fused image;
a first eyepiece aligned with the fused image; and
a second eyepiece aligned with the image from the second channel, wherein the fused image viewed through the first eyepiece is larger than an image viewed through the second eyepiece.

20. The binocular vision system of claim 19, wherein the display information comprises at least one of text, numbers, symbology, illustrations, and icons.

21. The binocular vision system of claim 19, wherein the display information comprises information received from a remote location.

22. The binocular vision system of claim 21, wherein display information comprises at least one of commands from headquarters, operator global coordinates, and vehicle control/operating information.

23. The binocular vision system of claim 19, wherein the first range of wavelengths is the visible spectrum.

24. The binocular vision system of claim 19, wherein the first eyepiece is configured to magnify the fused image so that the fused image appears larger than the image viewed through the second eyepiece.

25. The binocular vision system of claim 24, wherein the first eyepiece is configured to magnify the fused image 1–10% larger than the image viewed through the second eyepiece.

26. The binocular vision system of claim 25, wherein the first eyepiece is configured to magnify the fused image 2–4% larger than the image viewed through the second eyepiece.

27. The binocular vision system of claim 19, wherein the second eyepiece is configured to demagnify the image from the second channel so that the fused image appears larger than the image viewed through the second eyepiece.

28. The binocular vision system of claim 19, wherein the first eyepiece and the second eyepiece are coupled to the housing.

* * * * *